(12) United States Patent
He et al.

(10) Patent No.: US 9,118,235 B2
(45) Date of Patent: Aug. 25, 2015

(54) PERMANENT MAGNET MOTOR

(75) Inventors: Xue Ming He, Shenzhen (CN); Hai Yang Wang, Shenzhen (CN); Qiang Zhou, Shenzhen (CN)

(73) Assignee: Johnson Electric S.A., Murten (CH)

( * ) Notice: Subject to any disclaimer, the term of this patent is extended or adjusted under 35 U.S.C. 154(b) by 154 days.

(21) Appl. No.: 13/481,686

(22) Filed: May 25, 2012

(65) Prior Publication Data

US 2012/0299427 A1 Nov. 29, 2012

(30) Foreign Application Priority Data

May 26, 2011 (CN) .......................... 2011 1 0143299

(51) Int. Cl.
| | | |
|---|---|---|
| *H02K 23/04* | (2006.01) | |
| *H02K 1/17* | (2006.01) | |
| *H02K 23/00* | (2006.01) | |
| *H02K 5/04* | (2006.01) | |
| *H02K 23/40* | (2006.01) | |

(52) U.S. Cl.
CPC ........ *H02K 23/00* (2013.01); *H02K 5/04* (2013.01); *H02K 23/405* (2013.01); *H02K 2213/03* (2013.01)

(58) Field of Classification Search
None
See application file for complete search history.

(56) References Cited

U.S. PATENT DOCUMENTS

| | | | | |
|---|---|---|---|---|
| 4,296,343 | A * | 10/1981 | McMillen ................. | 310/154.48 |
| 5,183,516 | A * | 2/1993 | Sagawa et al. ............ | 148/302 |
| 5,387,356 | A * | 2/1995 | Hamamura ................ | 252/62.58 |
| 5,846,449 | A * | 12/1998 | Taguchi et al. ............ | 252/62.62 |
| 5,866,028 | A * | 2/1999 | Toyota ...................... | 252/62.63 |
| 6,979,409 | B2 * | 12/2005 | Chen et al. ............... | 252/62.54 |

FOREIGN PATENT DOCUMENTS

JP     2006-211838     8/2006

* cited by examiner

*Primary Examiner* — Tran Nguyen
(74) *Attorney, Agent, or Firm* — Muncy, Geissler, Olds & Lowe, P.C.

(57) ABSTRACT

A permanent magnet motor has a rotor and a stator. The rotor has a shaft, a rotor core fixed to the shaft, a commutator fixed to the shaft adjacent to the rotor core, and rotor windings wound about poles of the rotor core and electrically connected to the commutator. The stator includes a magnetically conductive round housing, permanent magnets fixed to an inner surface of the housing, and brushes for making sliding contact with the commutator. The ratio of an outer diameter of the rotor core to an outer diameter of the housing is between 66% to 84%.

10 Claims, 3 Drawing Sheets

PERMANENT MAGNET MOTOR

CROSS REFERENCE TO RELATED APPLICATIONS

This non-provisional patent application claims priority under 35 U.S.C. §119(a) from Patent Application No. 201110143299.2 filed in The People's Republic of China on May 26, 2011.

FIELD OF THE INVENTION

This invention relates to a permanent magnet motor, and in particular, to a permanent magnet motor especially suitable for kitchen appliance like soybean milk makers or food mixers.

BACKGROUND OF THE INVENTION

Many appliances and devices today use electric motors. Many of the appliances, like kitchen appliances such as soybean milk makers or food mixers, want the electric motor to be smaller, lighter and more powerful so as to reduce the size of the appliance with the same performance or to improve the performance of the appliance without increasing its size.

In some conventional kitchen appliances high voltage direct current (HVDC) motors are used. The HVDC motor has a stator and a rotor. The stator has a round housing with one or more permanent magnets fixed to the inner surface of the housing. The rotor has a rotor core and rotor windings wound about poles of the rotor core. The rotor windings are supplied with HVDC power via a commutator and brushes. In a known HVDC motor, the housing of the motor has an outer diameter of 36 mm, the rotor core has an outer diameter of 22.8 mm, and the ratio of the outer diameter of the rotor core to the outer diameter of the housing is 63.3%. The power output of the motor is typically less than 40 watts.

By round housing we mean that the housing has a round or circular cross section. HVDC is generally used to mean a DC voltage of a level derived from a domestic AC electrical supply. Depending on the method of converting the AC power to DC power, the resulting DC power may be between half to same as the supply voltage. Thus HVDC is taken to mean a DC voltage in the range of 50V to 400V.

The present invention aims to provide a permanent magnet motor having higher power output without increasing its size, which is greatly appreciated by the kitchen appliance manufacturers and their customers.

SUMMARY OF THE INVENTION

In one aspect, the present invention provides a permanent magnet motor, comprising a stator and a rotor. The rotor comprises a shaft, a rotor core fixed to the shaft, a commutator fixed to the shaft adjacent to the rotor core, and rotor windings wound about poles of the rotor core and electrically connected to the commutator. The stator comprises a magnetically conductive round housing, at least one permanent magnet fixed to an inner surface of the housing, and brushes for making sliding contact with the commutator. The ratio of an outer diameter of the rotor core to an outer diameter of the housing is in the range of 66% to 84%.

Optionally, the ratio of the outer diameter of the rotor core to the outer diameter of the housing is in the range of 70% to 80%.

Preferably, the at least one permanent magnet comprises a plurality of ferrite magnets.

Preferably, the ferrite magnets are made of a material with a maximum energy product BHmax greater than 4.3 MGOe.

Preferably, the ferrite magnets are made of material with a residual magnetic flux density Br of 4000~4400 Gs and an intrinsic coercive force Hcj of 4000~5000 Oe.

Preferably, the ferrite magnets are made of a material with a residual magnetic flux density Br of 4200~4400 Gs and an intrinsic coercive force Hcj of 4400~4600 Oe.

Preferably, the outer diameter of the housing is 35.7 mm±3.6 mm and the outer diameter of the rotor core is 25.1 mm±2.5 mm.

Preferably, the rated power output of the motor is in the range of 50 to 80 watts.

Preferably, the radial length of a body of the rotor pole is 6.2 mm±0.6 mm, the circumferential width of the body of the rotor pole is 1.4 mm±0.2 mm, and the minimum distance between two adjacent rotor poles is 1.6 mm±0.2 mm.

Alternatively, the outer diameter of the housing is 42.5 mm±4.3 mm and the outer diameter of the rotor core is 29.5 mm±3 mm.

Alternatively, the rated power output of the motor is between 80 to 100 watts.

Alternatively, the radial length of a body of the rotor pole is 6.2 mm±0.6 mm, the circumferential width of the body of the rotor pole is 1.8 mm±0.2 mm, and the minimum distance between two adjacent rotor poles is 1.6 mm±0.2 mm.

Preferably, the rotor core has 12 slots, the commutator has 24 commutator segments and the stator has 2 magnetic poles.

Preferably, the motor is a HVDC motor.

In another aspect, the present invention provides a kitchen appliance comprising a base, a driven mechanism rotatable relative to the base, and a permanent magnet motor for driving the driven mechanism, as described above. That is the permanent magnet motor comprises a stator and a rotor. The rotor comprises a shaft, a rotor core fixed to the shaft, a commutator fixed to the shaft adjacent to the rotor core, and rotor windings wound about poles of the rotor core and electrically connected to the commutator. The stator comprises a magnetically conductive round housing, at least one permanent magnet fixed to an inner surface of the housing, and brushes for making sliding contact with the commutator. The ratio of an outer diameter of the rotor core to an outer diameter of the housing is in the range of 66% to 84%.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
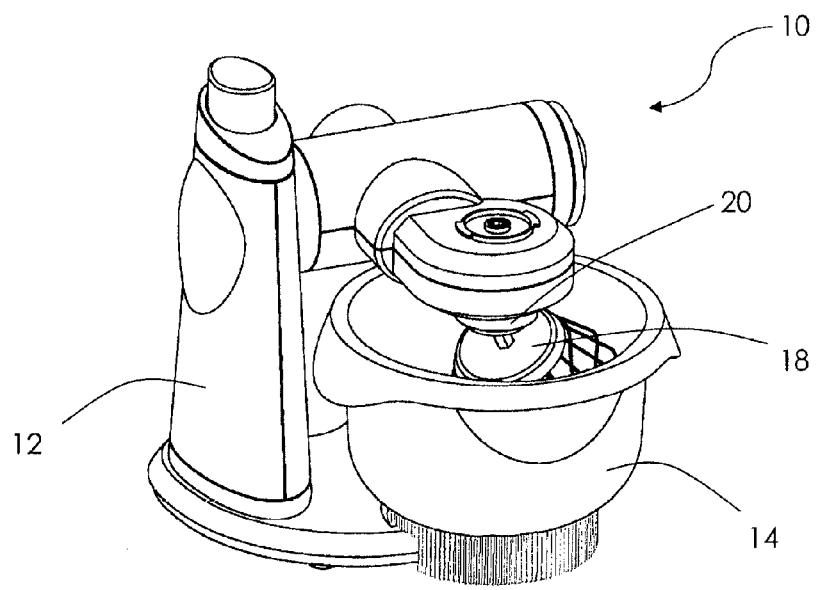
FIG. 1 is a view of a kitchen appliance incorporating a permanent magnet motor in accordance with a preferred embodiment of the present invention.

FIG. 1 illustrates a kitchen appliance 10 incorporating a permanent magnet motor in accordance with a preferred embodiment of the present invention. The kitchen appliance 10 is a food mixer which comprises a base 12, a container 14 fixedly or removably seated on the base 12 for containing food to be mixed, a permanent magnet motor 16 (not shown in FIG. 1), a working piece 18 for processing food in the container 14 and a coupling 20 for connecting the working piece 18 to the motor. Alternatively, the kitchen appliance may be other types of food processors, such as a soybean milk maker.

The permanent magnet motor is fixed within the base 12. Preferably, the permanent magnet motor 16 is a HVDC motor.

Figure 2:
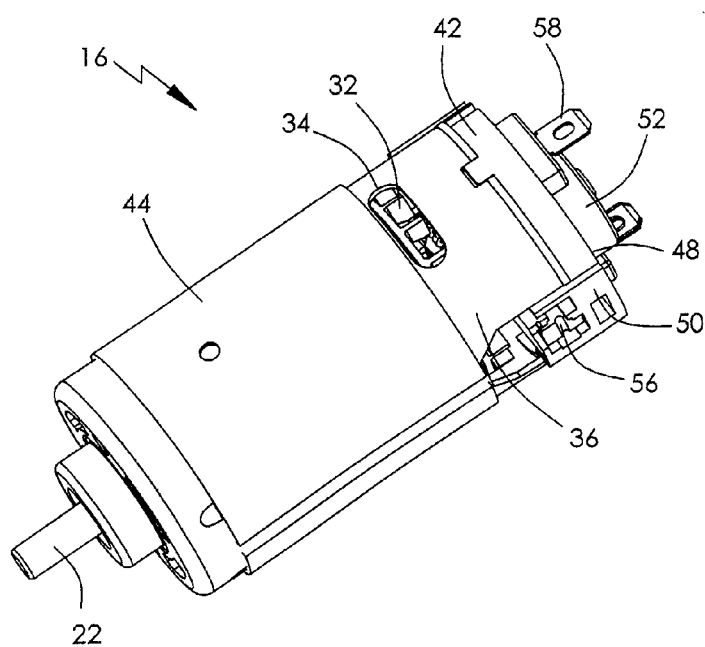
FIG. 2 is a view of the permanent magnet motor in accordance with the preferred embodiment.
Figure 3:
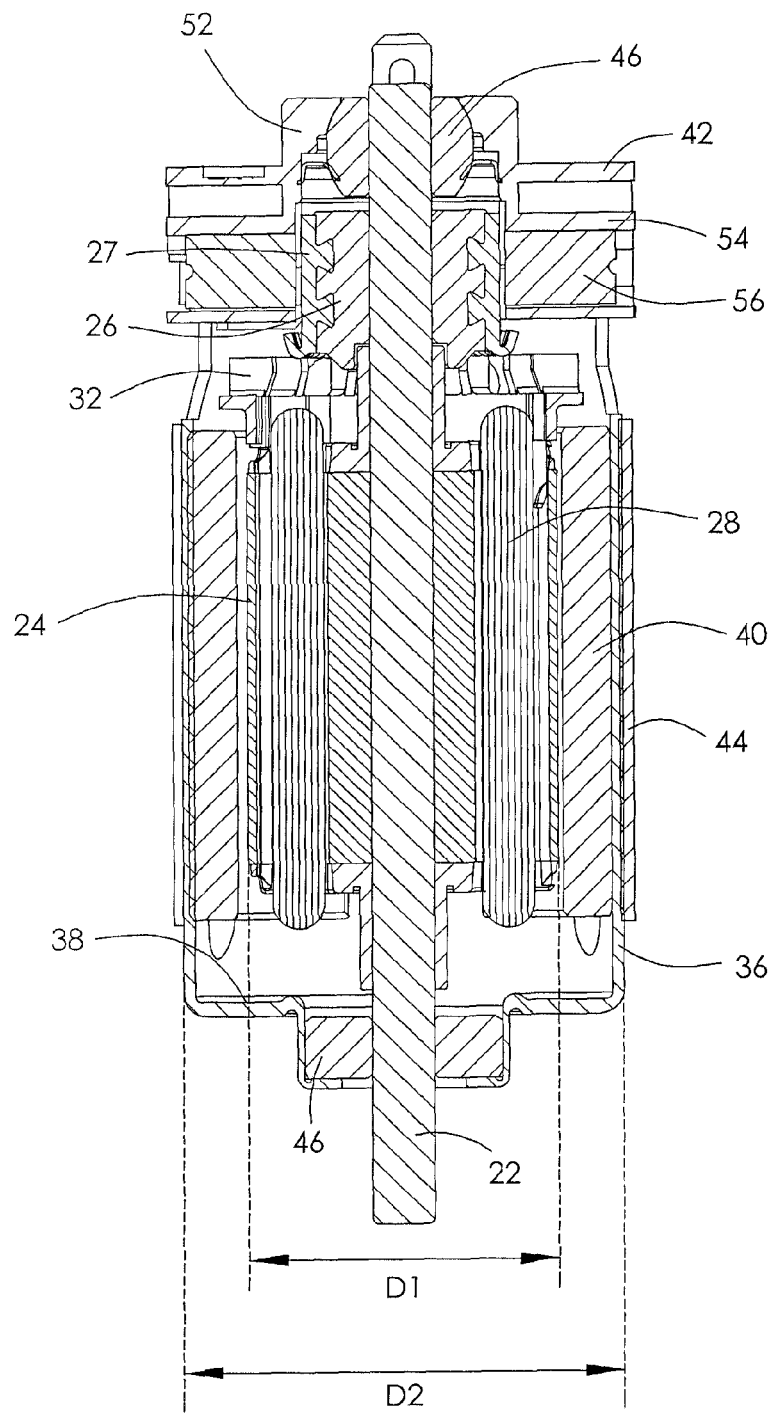
FIG. 3 is a sectional view of the motor of FIG. 2.
Figure 4:
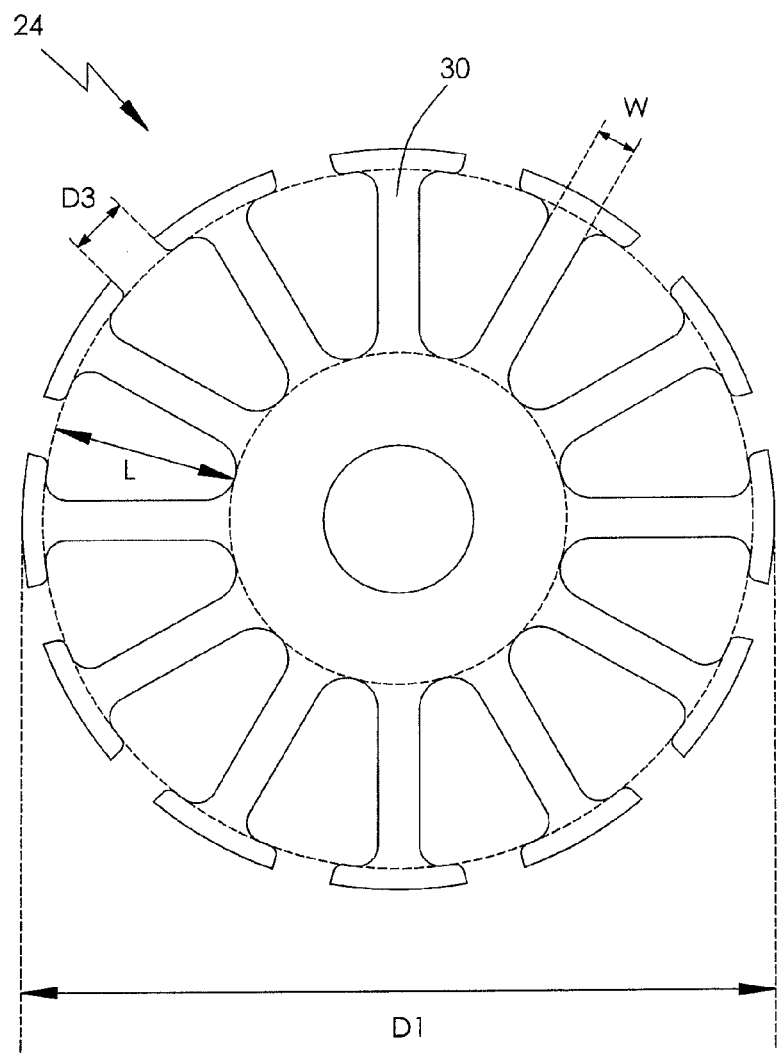
FIG. 4 is a view of a rotor core being a part of the motor of FIG. 2.

Referring to FIGS. 2 to 4, the HVDC motor 16 comprises a stator and a rotor. The rotor comprises a shaft 22, a rotor core 24 fixed on the shaft 22, a commutator 26 fixed on the shaft 22 adjacent the rotor core 24, and rotor windings 28 wound about poles 30 of the rotor core 24 and electrically connected to the commutator 26. Outer surfaces of the rotor poles 30 form a circle. Slots are formed between adjacent rotor poles 30 for accommodating the rotor windings 28. A fan 32 is fixed to the rotor core 24 and co-operates with openings 34 in a housing 36 of the motor to create air flow to cool the motor 16 when rotating. Preferably, the rotor core has 12 slots and the commutator has 24 commutator segments 27.

The stator comprises an axially extending round housing 36 having an open end and a closed end 38, two permanent magnets 40 fixed to the inner surface of the housing 36, an end cap 42 closing the open end of the housing 36, and a pair of brush assemblies. The housing 36 is made of magnetically conductive material. A flux ring 44 is fixed to the outer surface of the housing 36 to reduce the magnetic resistance of the flux return path of the housing 36. The end cap 42 is fixedly mounted to the housing 36. The shaft 22 is supported by two bearings 46 respectively located on the end cap 42 and the closed end 38 of the housing with the rotor core 24 confronting the permanent magnets 40. An air gap is formed between the rotor core 24 and the permanent magnets 40.

The end cap 42 has a base plate 48, a circular side wall 50 axially extending from the housing side of the base plate 48, and a bearing holder 52 axially extending from the base plate 48 for holding one of the bearings 46. The side wall 50 and the base plate 48 define a chamber with the commutator 16 being received therein. Each brush assembly has a brush bracket 54 which inwardly and radially extends from the side wall 50 and is in commutation with the chamber. A brush 56 is slidably received in the brush bracket 54 and urged by a resilient member or spring (not shown) into sliding contact with the commutator 26. Two electrical terminals 58 for electrically connecting to an external power supply are supported by the end cap 42. Each electrical terminal 58 is electrically connected to a corresponding brush 56 via a conductor (not shown). Thus, an HVDC power can be supplied to the rotor windings 28 via the electrical terminals 58, brushes 56 and the commutator 26.

In this embodiment, the permanent magnets 40 are made of higher-grade ferrite magnets with a residual magnetic flux density (Br) of 4000~4400 Gs, an intrinsic coercive force (Hcj) of 4000~5000 Oe and a maximum energy product (BHmax) greater than 4.3 MGOe. The ratio of an outer diameter D1 of the rotor core 24 to an outer diameter D2 of the housing 36 is in the range of 66% to 84%. Optionally, the ferrite magnets are made of material with a residual magnetic flux density (Br) of 4200~4400 Gs, an intrinsic coercive force (Hcj) of 4400~4600 Oe and a maximum energy product (BHmax) of 4.3-4.7 MGOe. The ratio of an outer diameter of the rotor core to an outer diameter of the housing is in the range of 70% to 80%.

As higher-grade ferrite magnets are optionally used in the preferred embodiments, the magnets can be made thinner while the magnetic performance is kept high enough so that the diameter of the rotor core can be increased without increasing the diameter of the housing. Therefore the rotor has more space to accommodate more rotor windings or windings with a greater number of turns and/or larger wire diameter to achieve a higher power output. Furthermore, temperature during operation of the motor can be reduced as a larger thermal mass is provided, and copper loss of the motor may be reduced as thicker wire for the rotor windings is possible.

In an example of a new 600 series HVDC motor in accordance with the preferred embodiment of the present invention, the housing has an outer diameter D2 of 35.7 mm, the outer diameter D1 of the rotor core is increased to 25.1 mm, the ratio of the outer diameter of the rotor core to the outer diameter of the housing increases to 70.3%, and the power output of the motor is increased into the range of 50 to 80 watts. So allowing a 10% variation in dimensions we say that the motor housing has an outer diameter of 35.7 mm±3.6 mm and the rotor core has an outer diameter of 25.1 mm±2.5 mm. Preferably, the radial length L of the body of the rotor pole is 6.2 mm±0.6 mm, the circumferential width W of the body of the rotor pole is 1.4 mm±0.2 mm, and the minimum distance D3 between two adjacent rotor poles is 1.6 mm±0.2 mm.

In an example of a new 700 series HVDC motor in accordance with the preferred embodiment of the present invention, the housing has an outer diameter D2 of 42.5 mm, the outer diameter D1 of the rotor core is increased to 29.5 mm, the ratio of the outer diameter of the rotor core to the outer diameter of the housing increases to 69.4%, and the power output of the motor is increased into the range of 80 to 100 watts. So allowing a 10% variation in dimensions we say that the motor housing has an outer diameter of 42.5 mm±4.3 mm and the rotor core has an outer diameter of 29.5 mm±3 mm. Preferably, the radial length L of the body of the rotor pole is 6.2 mm±0.6 mm, the circumferential width W of the body of the rotor pole is 1.8 mm±0.2 mm, and the minimum distance D3 between two adjacent rotor poles is 1.6 mm±0.2 mm.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor, comprising:
   a rotor comprising a shaft, a rotor core fixed to the shaft, a commutator fixed to the shaft adjacent to the rotor core, and rotor windings wound about poles of the rotor core and electrically connected to the commutator, and
   a stator comprising a magnetically conductive round housing, at least one permanent magnet fixed to an inner surface of the housing, and brushes for making sliding contact with the commutator,
   wherein the ratio of an outer diameter of the rotor core to an outer diameter of the housing is in the range of 70% to 80%;
   wherein the rated power output of the motor is in the range of 50 to 80 watts, and the radial length of a body of the rotor pole is 6.2 mm±0.6 mm;
   wherein the circumferential width of the body of the rotor pole is 1.4 mm±0.2 mm, and the minimum distance between two adjacent rotor poles is 1.6 mm±0.2 mm;

wherein the rotor core has 12 slots, the commutator has 24 commutator segments and the stator has 2 magnetic poles; and wherein the at least one permanent magnet comprises a plurality of ferrite magnets made of material with a maximum energy product BHmax greater than 4.3 MGOe.

2. The motor of claim 1, wherein the ferrite magnets are made of material with a residual magnetic flux density Br of 4000~4400 Gs and an intrinsic coercive force Hcj of 4000~5000 Oe.

3. The motor of claim 1, wherein the ferrite magnets are made of material with a residual magnetic flux density Br of 4200~4400 Gs and an intrinsic coercive force Hcj of 4400~4600 Oe.

4. A kitchen appliance comprising a base, a driven mechanism rotatable relative to the base, and the permanent magnet motor of claim 1 for driving the driven mechanism.

5. The motor of claim 1, wherein the outer diameter of the housing is 35.7 mm±3.6 mm and the outer diameter of the rotor core is 25.1 mm±2.5 mm.

6. A permanent magnet motor, comprising:
a rotor comprising a shaft, a rotor core fixed to the shaft, a commutator fixed to the shaft adjacent to the rotor core, and rotor windings wound about poles of the rotor core and electrically connected to the commutator, and
a stator comprising a magnetically conductive round housing, at least one permanent magnet fixed to an inner surface of the housing, and brushes for making sliding contact with the commutator, wherein the ratio of an outer diameter of the rotor core to an outer diameter of the housing is in the range of 66% to 84%;

wherein the rated power output of the motor is in the range of 80 to 100 watts, and the radial length of a body of the rotor pole is 6.2 mm±0.6 mm;

wherein the circumferential width of the body of the rotor pole is 1.8 mm±0.2 mm, and the minimum distance between two adjacent rotor poles is 1.6 mm±0.2 mm;

wherein the rotor core has 12 slots, the commutator has 24 commutator segments and the stator has 2 magnetic poles; and wherein the at least one permanent magnet comprises a plurality of ferrite magnets made of material with a maximum energy product BHmax greater than 4.3 MGOe.

7. The motor of claim 6, wherein the ferrite magnets are made of material with a residual magnetic flux density Br of 4000~4400 Gs and an intrinsic coercive force Hcj of 400~05000 Oe.

8. The motor of claim 6, wherein the ferrite magnets are made of material with a residual magnetic flux density Br of 420~04400 Gs and an intrinsic coercive force Hcj of 4400~4600 Oe.

9. The motor of claim 6, wherein the outer diameter of the housing is 42.5 mm±4.3 mm and the outer diameter of the rotor core is 29.5 mm±3 mm.

10. A kitchen appliance comprising a base, a driven mechanism rotatable relative to the base, and the permanent magnet motor of claim 6 for driving the driven mechanism.

\* \* \* \* \*